Aug. 7, 1956 W. R. EGAN 2,757,817
ELECTRICAL OUTLET BOX
Filed April 29, 1954

Warren R. Egan,
Inventor.
Koenig and Pope,
Attorneys.

United States Patent Office 2,757,817
Patented Aug. 7, 1956

2,757,817

ELECTRICAL OUTLET BOX

Warren R. Egan, Jennings, Mo.

Application April 29, 1954, Serial No. 426,418

3 Claims. (Cl. 220—3.5)

This invention relates to electrical outlet boxes, and with regard to certain more specific features, to such boxes forming receptacles for wall switches, junctions and the like.

Among the several objects of the invention may be noted the provision of an electrical outlet box having improved, more rigid mounting means, useful particularly in connection with wallboard type facings and also applicable to older lath and plaster type facings; and the provision of a box of the class described the fastenings of which may be reached conveniently either before or after the wall facing is in position and which is equally convenient for use in either new or old building constructions. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a front elevation of my new electrical outlet box;

Corresponding reference characters indicate corresponding parts throughout the several views of the drawings.

Figure 1:
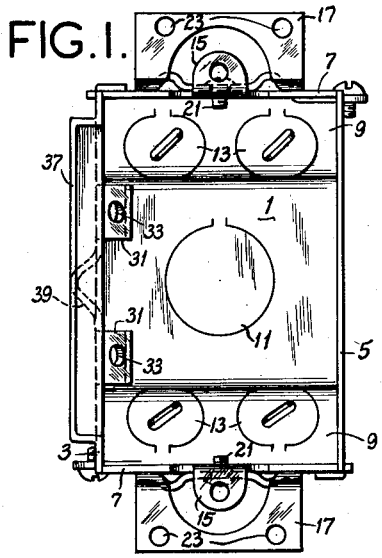
Figure 2:
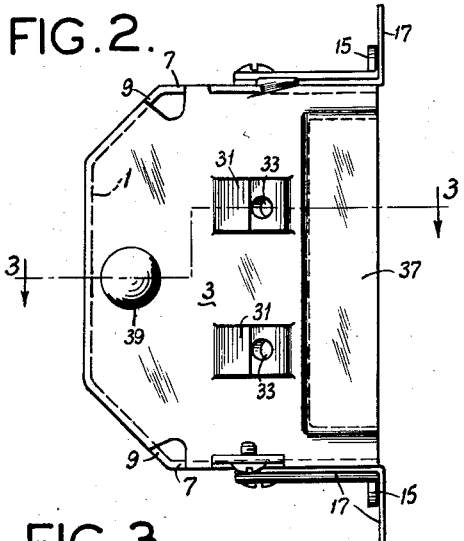
Fig. 2 is a left side view of Fig. 1.
Figure 3:
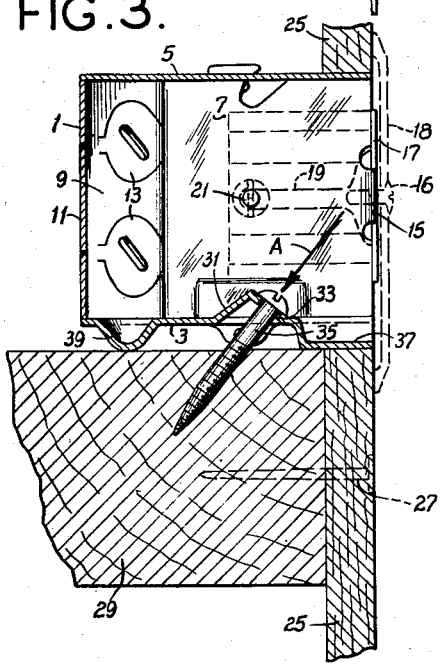
Fig. 3 is a cross section taken on line 3—3 of Fig. 2, the box being shown as attached to a wall stud.

Referring now more particularly to the drawings, there is shown in Figs. 1–3 a box constituted by a back wall 1, side walls 3 and 5, and end walls 7 which are joined to the back wall 1 by beveled portions 9. Knock-out plugs 11 and 13 serve the usual purpose of providing openings when knocked out for passage of electrical wiring which serves the switch or junction (not shown) to be mounted in the box. The end walls 7 are provided with struck-out ears 15, having threaded openings for receiving screws 16 which hold the usual wall cover plate 18 employed with receptacles of this type. Parts 16 and 18 are shown for example in dotted lines in Fig. 3. At 17 are shown L-shaped fasteners, slotted as shown at 19 for adjustable attachment by means of screws 21 to the ends of the box. The members 17 contain openings 23 for receiving screw fasteners for attachment of the box to the usual plaster wall after an opening has been made in the wall for reception of the box. The construction described has been satisfactory for older lath and plaster type walls, because the screws used in the openings 23 can usually reach one or more of the laths to effect a rigid enough fastening.

Many modern wall constructions do not employ laths and plaster, but wallboard such as illustrated, for example, at numeral 25. The wallboard is usually nailed as at 27 to wall studs such as shown at 29. When attempts are made to attach switch and junction boxes to such wallboards by screws passing through openings such as shown at 23, they enter the wallboard close to its margins around the opening. The result often is unsightly damage to the wallboard, as well as an inferior fastening from the viewpoint of rigidity. For example, such attachment is particularly unsatisfactory in the case of so-called plasterboard, which tends to crumble when pierced at the edges; or in the case of fiberboard, which tends to fray when pierced at the edges.

It has been suggested to effect attachment of the box to one of the studs, but the constructions for accomplishing this have been of a nature requiring mounting of the box prior to application of the wall facing. This was because the fastening means could not be reached except in the absence of the wall facing. In the following, I provide a construction for attachment of the box to a stud through fastening means accessible from the inside and front of the box when open. This is accomplished without damage to the wallboard by providing on one wall 3 inwardly struck two-legged angled protrusions or portions 31, provided with angled openings 33 for the angular reception of screws 35 adapted to be driven from the inside of the box into one of the studs 29.

Struck out and protruding from one side of the wall 3 along and near the marginal opening of the box is a vertically elongate rectangular supporting pad or flat seating portion 37. This portion 37 is on one side of the fastening portions 31 (viewed as in Figs. 2 and 3) and, being struck out, is hollow. On the other side of these fastening portions a dimple 39 of suitable form is struck out and protrudes from the wall 3. Thus the inward protrusions 31 are located intermediately between the pad 37 and dimple 39. The elevations of the struck-out portions 37 and 39 are preferably the same, so as to provide supports on opposite sides of the screws 35. These supports engage the stud 29 to which the box is fastened by means of the screws 35, and provide for alignment against the side supporting stud 29.

Figure 4:
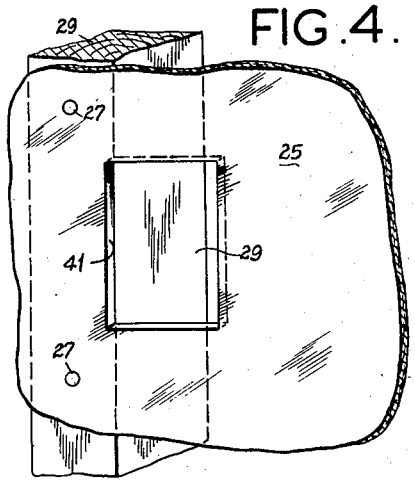
Fig. 4 is an isometric view, showing a wallboard prepared for receiving the box; and, Fig. 5 is a view similar to Fig. 4, showing the box in position in the wallboard and attached to a stud.
Figure 5:
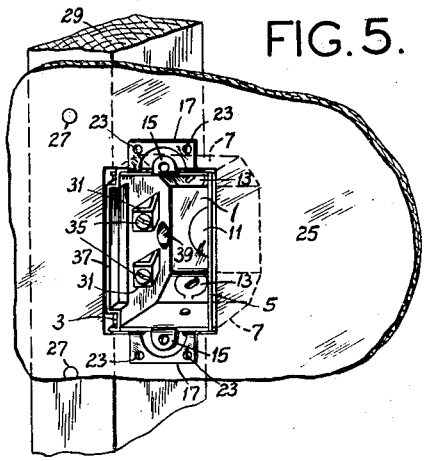

Referring to Fig. 4, the wallboard 25 is shown as having been provided with an opening 41 adjacent stud 29 for the purpose of receiving the box. As shown in Fig. 5, the box has been inserted into the opening, thus placing supports 37, 39 against the stud. Then screws 35 are angularly applied through the angled openings 33 in the fastening portions 31 and turned down by a screw driver inserted angularly into the box through the front opening. Contact of the screw heads with portions 31 draws the box into the opening and against the stud, the L-shaped members 17 snugly engaging the wallboard at top and bottom margins of the opening 41. Since the protrusions 31 are at a substantial distance from the margin of the front opening of the box, the wallboard 25 is passed by the screws 35 and not damaged. It will be noted that the line of action of the screws 35 is such as to apply the holding force on the box between the supports afforded by the members 37 and 39. The support by 37 is on a line between the openings 33 and the margin of the box opening; and the support by 39 is on a line between openings 33 and back 1. The result is a well anchored, accurately positioned box. The three-point support affords nonrocking box alignment on the stud 29. The protrusion 37, being in the form of a pad, avoids gouging into the edge of the wallboard.

An advantage of the box is that no fasteners are used in connection with the tongues 17 and the wallboard 25, although these tongues act as depth distancing pieces for the box in respect to the board. Distancing can be adjusted by changing the positions of the members 17 on the box (see the screw and slot fastening means 19, 21).

Another feature of the invention will be seen from a consideration of Fig. 3. The arrow A shows how the screws 35 are reached by means of a screw driver inserted into the front opening of the box before insertion of its contents and before application of the plate 18. The screw heads are thus exposed to manipulation by the screw driver after the wallboard 25 has been nailed to the studding 29.

If it is desired to mount the box on old lath and plaster construction away from studs such as 29, it is done by driving screws through the openings 23 to reach a lath, as has been usual heretofore.

The raised portions provided by the portions 31 within the box are in a location which does not interfere with insertion of the switch or other electrical parts into the box. While I have illustrated my invention with the fastening portions 31 arranged in one side wall only of the box, the same may be provided on the opposite wall, or on both walls. However, arrangement on one wall is generally sufficient, because the box may be turned upside down for application to either side of a stud.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An electrical outlet box adapted for side mounting on a stud and marginally flush application through a wallboard opening adjacent the stud comprising back, end and side walls and having rectangular front access opening, ears extending out from the end walls to form stops engageable with the face of the wallboard, a flat outwardly projecting means struck out from at least one of said side walls and extending for a substantial distance along one side of said access opening, a second outwardly struck projecting means on said one side wall and projecting substantially the same amount as said first projecting means, at least one inwardly angled struck-in protrusion on said one side wall located intermediately between said outwardly projecting means, said inward protrusion having an opening adapted for angular passage of a fastener through the wall.

2. An electrical outlet box adapted for side mounting on a stud and marginally flush application through a wallboard opening adjacent the stud comprising back, end and side walls and having a rectangular front access opening, ears extending from said end walls to form stops engageable with the face of the wallboard, a forward outwardly projecting flat and hollow supporting pad means struck out from a side wall and rectangularly shaped and extending for a substantial distance along a substantial portion of the margin of said access opening, at least one rearwardly located and outwardly projecting supporting portion struck out on said one side wall which portion is substantially symmetrically centralized relative to the vertical extent of said rectangularly shaped pad portion and projecting out substantially equally thereto, at least one inwardly angled protruding means struck in from said one side wall and located between said forward and rearward projecting portions and also substantially symmetrically centralized relative to the vertical extent of said rectangular pad portion, said protrusion having an opening adapted for angular passage of a fastener through the wall.

3. An electrical outlet box adapted for side mounting on a stud and marginally flush application through a wallboard opening adjacent the stud comprising back, end and side walls and having a front access opening, adjustable means forming adjustable stops on the end walls and engageable with the face of the wallboard, a forward outwardly projecting flat and hollow supporting pad portion struck out from a side wall and shaped as a continuous rectangle extending along a substantial portion of the margin of said access opening, one rearwardly located and outwardly projecting supporting portion struck out on said one side wall which is substantially centralized relative to the vertical extent of said rectangular pad and projecting out substantially equally thereto, two inwardly angled protrusions struck in from said one side wall and located between said forward and rearward projecting portions and also substantially symmetrically centralized relative to the vertical extent of said rectangular pad portion, each of said inward protrusions having an opening adapted for angular passage of a fastener through the wall.

References Cited in the file of this patent

UNITED STATES PATENTS

| 1,605,168 | Burk, et al. | Nov. 2, 1926 |
| 2,639,054 | Austin | May 19, 1953 |

FOREIGN PATENTS

| 753,050 | France | July 31, 1933 |